May 7, 1957 R. V. JUDY 2,791,632

COMBINED TELEPHONE AND DICTATION SYSTEM

Filed April 16, 1954 2 Sheets-Sheet 1

COMBINED TELEPHONE AND DICTATION SYSTEM

Filed April 16, 1954 2 Sheets-Sheet 2

United States Patent Office 2,791,632

Patented May 7, 1957

2,791,632

COMBINED TELEPHONE AND DICTATION SYSTEM

Robert V. Judy, Chicago, Ill., assignor to International Telephone and Telegraph Corporation, a corporation of Maryland Application April 16, 1954, Serial No. 423,692

10 Claims. (Cl. 179—6)

This invention relates to a combined telephone and dictation system. Its general object is to provide added facilities which will enable any designated telephone of a telephone system to become operatively extended to an idle one of a group of dictation machines upon the calling of a number assigned to the group, whereby the dictation machines used by a number of persons are placed in a common pool.

A further object is to so arrange the system that a connected dictation machine may be controlled satisfactorily from the calling telephone with a minimum of added apparatus and wiring.

GENERAL DESCRIPTION

It has been chosen to disclose the invention as applied to a private automatic telephone system of a multi-hundred-line capacity, such as may serve a sizable establishment. Such a system employs selectors having levels leading respectively to the hundreds groups of lines.

A spare selector level is employed for trunks extending to respective dictation machines of the pool, whereby an idle dictation machine is taken for use upon the dialing of the corresponding single-digit number, such as 9.

A feature of the invention is that each dictation trunk is provided with trunk apparatus controllable from the calling telephone to exercise the necessary controls over the associated dictation machine. According to this feature, the trunk apparatus starts the motor of the machine when the trunk is seized; it causes the clutch of the machine to operate when a button is pushed on the calling telephone; and it counts impulses sent to the seized trunk to signal an attendant or to cause the machine to exercise a desired function.

An important circuit feature of the invention is that the impulse-counting mechanism of a trunk is restored to normal responsive to the first dial pulse of a series, and is reset by the remaining pulses of the series.

Other objects and features will appear as the description progresses.

*The drawings*

Fig. 1 is a single-line switching diagram of a system embodying the invention.

Figs. 2 and 3 comprise a circuit diagram of sufficient of the apparatus of Fig. 1 to enable the invention to be understood.

DETAILED DESCRIPTION

The invention having been described generally, a detailed description will now be given.

Figures 1, 2:
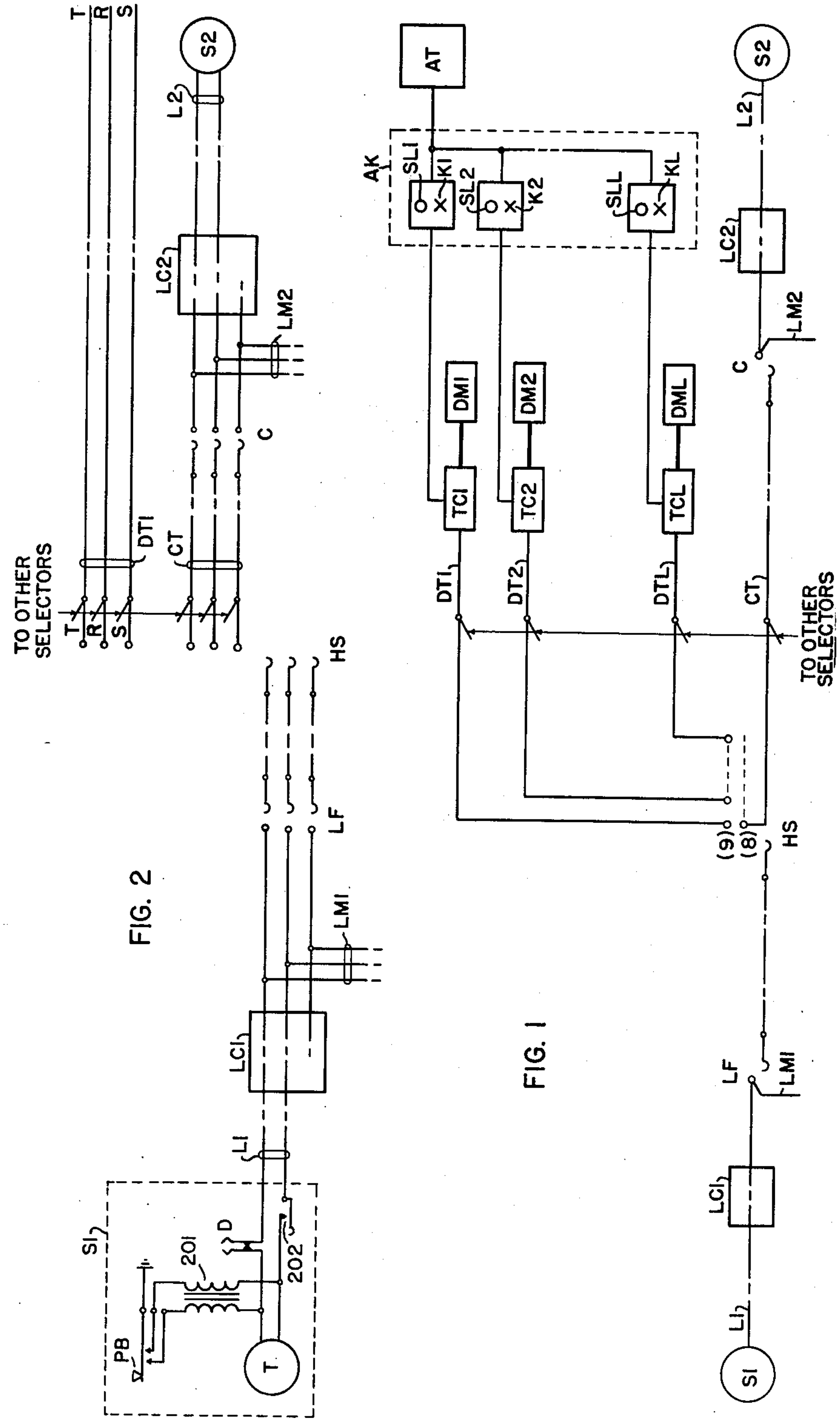

*Fig. 1—Switching diagram*

Referring to Fig. 1, the switching system may encompass several hundred lines divided into the usual decimal groups of one hundred lines each. L1 is a line of one of the 100-line groups. It serves telephone station S1, and is equipped with line circuit LC1. L1 is accessible to line finder LF, and is connected by line multiple LM1 to bank contacts of other switches (finders and connectors) serving the 100-line group. Line L2 may be similar to L1, and in the same or another 100-line group. It is accessible to connector C, and is connected by line multiple LM2 to other switches (finders and connectors) serving the same 100-line group.

The line finders are linked to respective hundreds selectors, line finder LF being linked to hundreds selector HS. The several hundreds selectors have their bank contacts connected in multiple level-by-level in the usual manner, giving them common access to the several levels of trunks, usually ten. As many of these levels of trunks as needed are used for access to respective groups of connectors. Connector trunk CT is one of the trunks which extends from selector level 8 to connector C.

From selector level 9, dictation trunks DT1 to DTL extend through respective trunk circuits TC1 to TCL to dictation machines DM1 to DML, respectively.

The trunk circuits TC thus occupy the trunking position of a group of connectors.

Equipments AT and AK are common to trunk circuits TC and trunks DT.

Attendant's telephone AT may be selectively connected to the dictation trunks by respective keys K1 to KL of equipment AK, as when the attendant is signalled by one of the individual signal lamps SL1 and SLL.

If it is desired to make a call from station S1 on line L1, the usual line signal causes line circuit LC1 to respond. An idle line finder, such as LF is thereby caused to connect its associated selector HS to the calling line L1.

If it is desired to call line L2, the digit 8 may now be dialed. Selector HS is thereby stepped to level 8, and it thereupon selects an idle connector trunk such as CT, extending to connector C. The subsequent dialing of the tens and units digit in the number of the desired line, L2, steps connector C to the corresponding level and to the contact set of line L2. Station S2 on called line L2 is then signalled in the usual manner until the call is answered, the connection being released when the handsets (not shown) are replaced.

If it is desired to dictate from station S1, after a line finder LF and selector HS is seized, the digit 9 may be dialed causing selector HS to step to level 9, and to select an idle dictation trunk DT.

For a system of less than 100 lines, the hundreds selectors HS are eliminated, and line finders LF are linked directly to respective connectors C. Then, if the connectors C are of the trunk-hunting switch-through type on a desired level, the connections to dictation trunks may be taken from that level, such as the 9th.

Figure 3:
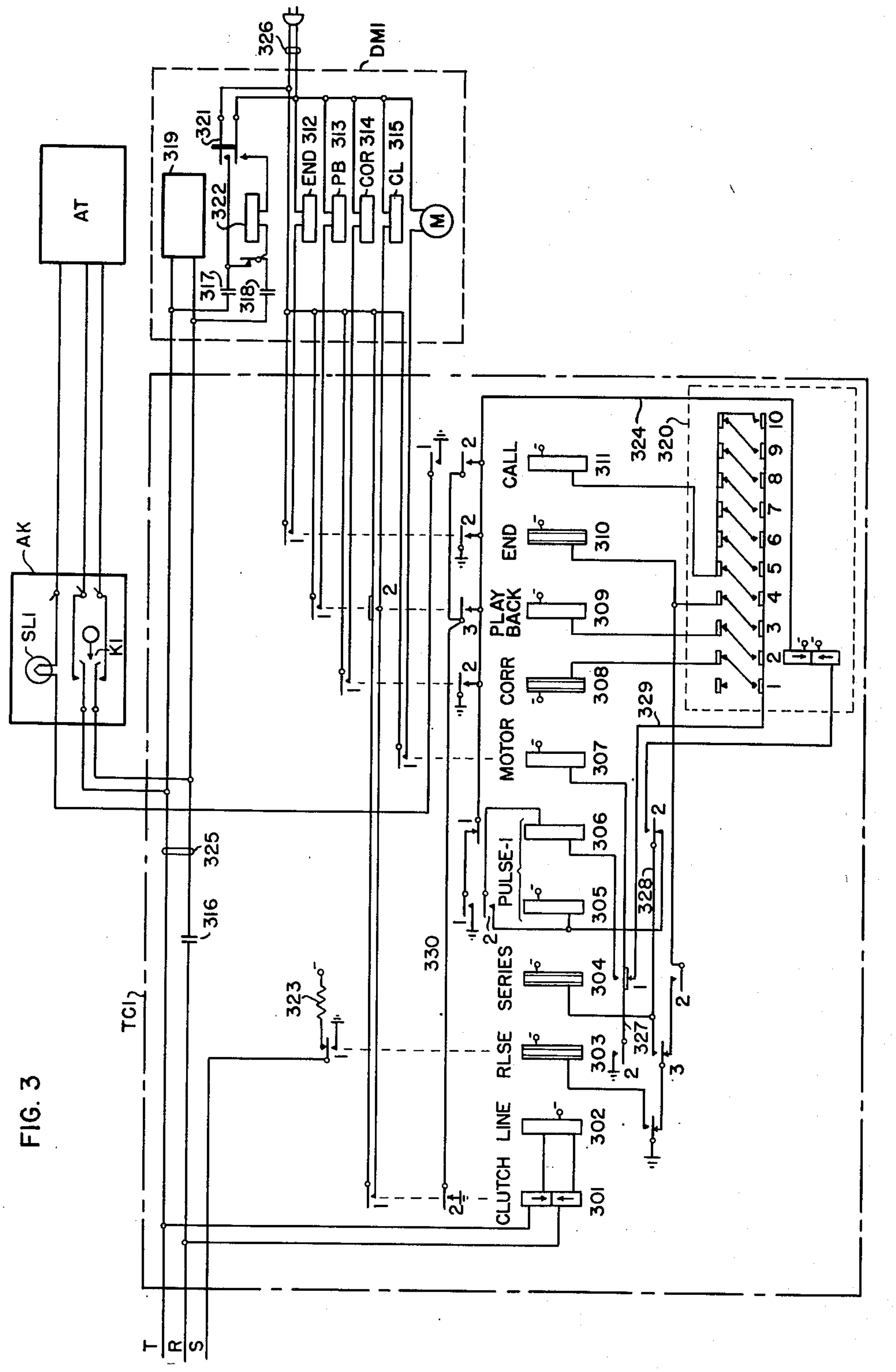

*Figs. 2 and 3—Circuit diagrams*

Referring to Figs. 2 and 3, a call-through circuit diagram is shown, of the apparatus of Fig. 1 which was included in the described connection from line L1 to line L2, and in the described connection from line L1 to a dictation trunk, such as DT1, the circuits for the trunk circuit (TC1) for the latter trunk being shown in full.

*Dictation-control apparatus*

Stations from which the dictation machines DM are to be used are each equipped with a control push button as shown at PB for station S1. This push button is used to connect ground to the line through a retard coil 201 so long as held operated. Hookswitch contacts 202, dial D, and telephone apparatus T comprise the usual telephone station apparatus. The circuit arrangements (not shown) at line circuit LC1 and LC2, finders LF, selectors HS, and connectors C, may be of the usual loop-dialing type.

The dictation machines DM1 and DML are of the remote-controlled type, well known in the art. For illustration, machine DM1 is shown in Fig. 3 with function-control magnets 312 to 315 which control the performance of corresponding functions of the machine. The usual amplifying, recording, and playback equipment are represented at 319. The driving motor M and a signal buzzer 322 are also shown.

Trunk circuit TC1, Fig. 3, include control relays 301 to 311, and it includes impulse counter 320, which may be of the type disclosed in the United States Patent No. 2,538,818.

When ground pulses are delivered to the operating, lower winding of counter 320; its contact sets 1 to 10 are actuated successively, responsive respectively to the successive pulses. The counter clears out when a ground pulse is delivered from conductor 324 to its knockdown, upper winding.

*Station S1 calls dictation number*

If the user of station S1 desires to dictate, he removes his handset (not shown); waits for dial tone; and then calls the dictation number, the single digit 9.

When the handset is lifted, hook switch contact 202 close, causing line circuit LC1 to operate to start an idle finder, such as LF, to search for the calling line L1. When the line L1 is found, the selector HS is prepared for operation in the usual manner, and the usual dial-tone signal is sent back to S1.

When the dictation digit 9 is then dialed, by manipulating the usual dial calling device D, the illustrated contacts thereof generate a series of nine momentary interruptions in the closed line L1, thereby causing selector HS to operate to its 9th level and to rotate thereover in search of an idle trunk DT, being a trunk having an idle-indicating battery potential on the sleeve conductor thereof. It may be assumed that dictation trunk DT1 is the first one found idle and that it is therefore seized.

Trunk DT1 is normally marked idle by a connection to its conductor S from the negative pole of the exchange battery, by way of resistor 323 and back contact 1 of relay 303.

The connection from S1 is now extended by HS to trunk DT1, which is connected to TC1 and DM1 of Fig. 3. Tip and ring conductors T and R of trunk DT1 extend respectively to ground and to the negative pole of the usual exchange battery by way of the windings of clutch and line relays 301 and 302. The usual line current accordingly flows over the connection through relays 301 and 302. Clutch relay 301 does not operate at this time because its windings are differentially connected. Line relay 302 operates, and closes an operating circuit for release relay 303.

At its contacts 1, relay 303 removes idle-indicating battery potential from the sleeve conductor S and places ground potential thereon to mark the trunk busy at other selectors and to hold the established connection. It prepares an impulsing path at its contacts 3, and at its contacts 2, it grounds conductor 327 and closes an operating circuit for motor relay 307.

Motor relay 307 closes a circuit from power conductors 326 for operating the motor M of dictation machine DM1.

The trunk circuit TC1 and dictation machine DM1 are now prepared for dictation, and for other functions; with line relay 302, release relay 303, and motor relay 307 operated in the trunk circuit TC1; and the motor M of the machine DM1 running.

The dictator at station S1 may now proceed, holding push button PB operated while he is speaking to record, and releasing the push button when he wishes to stop the recorder while not talking.

Each time push button PB is operated, ground is connected to the conductors of line L1 through retard coil 201; shunting the upper windings of relays 301 and 302 and the tip side of the line loop with a low resistance path for the direct current flow. Direct current flow is therefore decreased through the tip side of the loop and increased through the ring side, and the balance of differential clutch relay 301 is upset.

Relay 301 operates, at its contacts 2 it grounds conductor 330, and at its contacts 1 it closes a circuit from power conductors 326 for operating clutch magnet 315 of dictation machine DM1.

Operation of clutch magnet 315 causes the recording medium (not shown) of apparatus 319 to be driven by motor M; and the dictation machine DM1 now records dictation from station S1.

The talking path extends from station S1, over the described connection to trunk DT1, and further over conductor pair 325, to apparatus 319 of dictation machine DM1. The condenser 316 in the ring conductor of pair 325 blocks direct current of the line loop from interfering with the apparatus 319. Retard coil 201 maintains line L1 balanced to ground for voice signals, during operation of push button PB.

When the end of the recording medium (not shown) is approached, contacts 321 are closed for a short period, completing an operate circuit to power conductors 326 for buzzer 322. A signal is transmitted through condensers 317 and 318, over the connection to station S1.

Other functions of the dictating machine DM1 are controlled by using dial D. After releasing push button PB to release the clutch of the machine, a desired function of the machine may be initiated by dialing the assigned digit.

When dial D is operated a series of circuit interruption impulses is transmitted constituting the digit, and line relay 302 is restored momentarily for each such interruption impulse in a series.

Release relay 303 remains operated throughout any series of impulse-induced restorations of line relay 302, being slow restoring because of its indicated copper sleeve.

Series relay 304 operates promptly upon the first restoration of line relay 302, the circuit being from ground, through the break contacts of relay 302 and make contacts 3 of relay 303. The series relay 304 is slow restoring because of its indicated copper sleeve, and remains operated until the end of a series of impulses.

Each restoration of line relay 302 delivers an impulse at its break contacts, through make contacts 3 of relay 303, to conductor 328.

The first impulse of a series over conductor 328 is transmitted through break contacts 2 of relay 306 to the winding of pulse-1 relay 305. Relay 305 operates promptly upon the first restoration of line relay 302, and closes a path from battery, through the windings of relays 305 and 306 in series, through contacts 2 of relay 305, and make contacts 1 of relay 304 to ground on conductor 327.

Relay 306 does not operate at this time because its winding is shunted by the operating ground of relay 305.

When ground is removed from conductor 328 at the end of the first impulse, relay 306 operates in series with relay 305, which remains operated.

Pulse-1 relays 305 and 306 deliver a ground pulse to conductor 324, the pulse starting when relay 305 operates to close its make contacts 1, and terminating when relay 306 operates to open its break contacts 1. This pulse is transmitted over conductor 324, to the upper, or restoring, winding of counter 320. If counter 320 remains actuated from a previous operation, it now restores.

Relay 306, at its contacts 2, transfers the impulse conductor 328 to the lower, or operating, winding of counter 320.

Thus, after the first impulse of a series, counter 320 is restored, and its operate winding is connected to impulse conductor 328.

When the remaining impulses of a series are delivered over conductor 328, the contact sets of counter 320 are actuated successively responsive respectively to the second and following impulses of a series.

Series relay 304 restores shortly after the last impulse of a series, at its make contacts 1 it opens the holding circuit for relays 305 and 306, and at its break contacts 1 it extends ground from conductor 327 to conductor 329.

Pulse-1 relays 305 and 306 are so adjusted that when they restore, contacts 1 of relay 305 open before contacts 1 of relay 306 close, to prevent a pulse being delivered to conductor 324.

The ground on conductor 329 is extended through contacts of counter 320, to operate one of the relays 308 to 311, depending on the digit dialed. The machine DM1 exercises the corresponding function, or the attendant is signalled, as described below.

If an error is made in dictation the dictator may dial the digit 2. After the series of two pulses, contact set 1 of counter 320 is actuated; and when series relay 304 restores, ground is extended to conductor 329 and is further extended through make contacts 1 and break contacts 2 of counter 320, to the winding of correction relay 308.

Relay 308 operates, and at its contacts 2 extends ground over conductor 324 to the upper, or restoring, winding of counter 320.

Counter 320 restores, and opens the circuit of relay 308. Relay 308 is slow restoring because of its indicated copper sleeve, and restores shortly, opening its contacts 2 to terminate the pulse over conductor 324.

While relay 308 is operated, it closes at its contacts 1 a circuit from power conductors 326, for opening correction magnet 314 of dictation machine DM1. A correction mark is made at the machine DM1 on an indicating pad. Push button PB may then be operated and dictation may proceed.

If the dictator wishes to have the dictation machine DM1 play back a portion of the message that has been dictated, he may dial the digit 3. After the series of three pulses, contact sets 1 and 2 of counter 320 are actuated; and when series relay 304 restores, an operating circuit is closed for playback relay 309 from ground extended to conductor 329, further extended through make contacts 2 and break contacts 3 of counter 320.

Relay 309 at its contacts 1 closes a circuit for playback magnet 313 of the dictation machine, and at its contacts 2 closes a circuit for clutch magnet 315. This will cause certain functions to be performed in the dictation machine DM1 to play back a portion of the recorded message to the dictator.

Playback may be stopped by pressing push button PB. Clutch relay 301 operates and from its contacts 2 extends ground through contacts 3 of relay 309 over conductor 324 to the knockdown winding of counter 320. Counter 320 restores, opening the operating circuit for relay 309. Relay 309 releases, opens the playback circuits at its contacts 1 and contacts 2 and terminates the knockdown pulse by opening its contacts 3. Dictation may then be resumed.

Playback is also stopped if another digit is dialed, when receipt of the first impulse causes the counter to restore.

The end of a letter may be marked by dialing digit 4. After the series of four pulses, contact sets 1 to 3 of counter 320 are actuated; and when series relay 304 restores, ground is extended over conductor 329, and further through make contacts 3 and break contacts 4 of counter 320 to operate the end-of-letter relay 310.

Relay 310, at its contacts 1, closes a circuit from power conductors 326 for the end-of-letter magnet 312, and at its contacts 2, extends ground over conductor 324 to the restoring winding of counter 320.

Counter 320 restores and opens the circuit of relay 310. Relay 310 is slow restoring because of its indicated copper sleeve, and restores shortly, opening its contacts 2 to terminate the pulse over conductor 324. At contacts 1 of relay 310 the circuit is opened for magnet 312.

The operation of magnet 312 for a short period causes an end-of-letter mark to be made on the indicating pad at the dictation machine DM1. The dictator may then proceed with the next item of dictation, operating push button PB while talking.

To signal the attendant the digit 5 may be dialed. After the series of five pulses, contact sets 1 to 4 of counter 320 are actuated; and when series relay 304 restores, ground is extended over conductor 329, and further through make contacts 4 and break contacts 5 of counter 320 to operate call relay 311.

Relay 311, at its contacts 2, connects conductor 324 to conductor 330; and at its contacts 1, closes a connection from ground, through signal lamp SL1 of the attendant's key equipment AK, to a circuit at the attendant's telephone AT. Lamp SL1 lights, and a buzzer (not shown) sounds at the attendant's telephone.

The attendant may operate the key K1 associated with the lit lamp SL1, thereby connecting her telephone AT to the conductor pair 325. A talking path now exists over the established connection between station S1 and the attendant's telephone AT. The dictator may give the desired instructions to the attendant.

The dialing of any digit higher than 5 will also signal the attendant.

The signalling circuit may be released by operating push button PB. Clutch relay 301 closes its contacts 2, extending ground over conductor 330, through contacts 2 of relay 311, over conductor 324 to the restoring winding of counter 320. Counter 320 restores, opening the operating circuit of relay 311. Relay 311 opens its contacts 2 to terminate the counter-restoring pulse, and at its contacts 1, opens the signal circuit.

The dialing of another digit will also release the signalling circuit, when receipt of the first impulse causes the counter to restore.

When the party at station S1 finishes dictating and returns the handset to its cradle, the calling line loop is opened. Line relay 302 restores and opens the operate path for release relay 303. Relay 303 remains operated for a short period, allowing series relay 304 to operate through make contacts 3 of relay 303 to ground at the break contacts of relay 302. Relay 304 remains operated for a short period after relay 303 restores, closing an operating circuit for end-of-letter relay 310 through contacts 2 of relay 304, break contacts 3 of relay 303 and the break contacts of relay 302 to ground. Relay 304 restores shortly and opens this path at its contacts 2.

Relay 310 operates for a short period, during which it closes its contacts 1 to operate magnet 312 of dictation machine DM1 to mark the end of the letter, and at its contacts 2 sends a pulse of ground over conductor 324 to the restoring winding of counter 320.

At contacts 1 of release relay 303, ground is removed from the sleeve of trunk DT1, and idle indicating battery through resistor 323 is connected thereto. The connection is now released, and the dictation trunk DT1 is ready to be seized for further use.

I claim:

1. In a combined automatic telephone system and dictation system, lines having respective stations thereon each equipped with an impulse sender for transmitting digit impulses for controlling automatic switching apparatus, common trunks, dictation trunks each having a dictation machine connected thereto, first switching apparatus and means for operating it to connect the line of any calling station with an idle common trunk, second switching apparatus and means for operating it responsive to digit impulses received at any connected common trunk from a calling line to selectively connect that trunk either to a desired called line or to an idle dictation trunk, each dictation machine including separate electromagnets for controlling respective functions thereof, each dictation trunk having control apparatus associated therewith for respectively controlling the said electromagnets, and means in each dictation trunk for selectively controlling the control apparatus thereof responsive to further impulses received from any connected calling line.

2. In a combined automatic telephone system and dictation system, according to claim 1, wherein the stations comprise first stations authorized to use the dictation machines and second stations not so authorized, each first station including a line-signal device which is not provided at any second station, any line-signal device being operable and restorable at will, means responsive to the operation of the line-signal device at any first station which is connected with a dictation trunk for sending a continuous line signal to the connected dictation trunk so long as the line-signal device remains operated, and means in any connected dictation trunk for causing the associated dictation machine to record such voice signals as are sent from the connected station only so long as the line signal is being received therefrom.

3. In a combined automatic telephone system and dictation system, according to claim 1, wherein the connection from any calling station over a common trunk to an idle dictation trunk comprises a two-wire loop, with transmitter-energizing current supplied to the loop at the dictation trunk from a current source having one pole grounded, a two-winding differential dictate relay in each dictation trunk having its windings oppositely connected in series with the respective connections from the current source to the loop, whereby the relay does not respond to the normal loop flow of direct current, the stations including first stations authorized to use the dictation machines and second stations not so authorized, each authorized station including dictate means for grounding the loop at will to thereby increase current flow at will over one conductor while decreasing current flow over the other, the differential dictate relay of a connected dictation trunk operating responsive to the unbalanced flow, and means for causing the associated dictation machine to operate to record such voice signals as are received from a connected station so long as its associated dictate relay is operated.

4. In a combined automatic telephone system and dictation system according to claim 3, each authorized station including two impedance devices, the dictate means comprising means for grounding the conductors of the loop through the impedance devices respectively, whereby balanced-to-ground voice signals may be transmitted over the grounded loop.

5. In a combined automatic telephone system and dictation system according to claim 1, an attendant telephone station associated with the dictation machines, signal devices at the attendant station corresponding respectively to the dictation trunks, switching means enabling an attendant to connect the attendant station to any dictation trunk, the control apparatus of each dictation trunk including selectively controlled means for causing the associated signal device to display a call signal.

6. In combination, a group of dictation machines, dictation trunks extending respectively to the dictation machines, dictating telephone stations, switching means for connecting any station to any idle dictation machine by way of its dictation trunk, each station including a line-signal device operable and restorable at will for sending start and stop signals respectively to a connected dictation trunk, means in any dictation trunk for starting the associated dictation machine for recording voice signals responsive to the said start signal from a connected station and for stopping the dictation machine from recording responsive to the said stop signal from such station, each station including an impulse sender for selectively sending desired series of digit impulses to a connected dictation trunk, each dictation trunk including a counting device having a normal position and being operable therefrom to count impulses in a series received from a connected station, each dictation trunk including control conductors for controlling respective auxiliary functions, each counting device including means for selectively energizing the associated control conductors according to the digit series counted, and further means responsive to the receipt of said start signal at any dictation trunk for restoring the associated counting device to normal position if operated.

7. In a combination according to claim 6, preliminary pulse-counting apparatus in each dictation trunk and means for operating it to count the first pulse in any received series and to mark the end thereof, and means controlled by any said preliminary apparatus for clearing out the associated counting device, if operated, responsive to the first impulse of any series and for preventing such first impulse from being counted by the said counting device, while permitting the counting device to count the succeeding impulses of any such series.

8. In combination, a group of dictation machines, dictation trunks extending respectively to the dictation machines, dictating telephone stations, switching means for connecting any station to any idle dictation machine by way of its dictation trunk for recording voice signals from the connected station, each station including an impulse sender for selectively sending desired series of digit impulses to a connected dictation trunk, each dictation trunk including a first counting device having a normal position and being operable therefrom to count the first impulse in any series received from a connected station, each dictation trunk also including a second counting device having a normal position and being operable therefrom to count impulses received from a connected station, means controlled by the first counting device for clearing out the second counting device, if operated, responsive to the first impulse of any received series and for preventing the second counting device from counting the first impulse of any series while permitting it to count the subsequent impulses thereof, each dictation trunk including control conductors for controlling respective auxiliary functions, the second counting device including means for selectively energizing the associated control conductors according to the digit series counted, and means including timing means for clearing out the first counting device at the end of any received series of digit impulses while leaving the second counting device operated.

9. In a combination according to claim 8, the first counting device including two relays and means for operating them responsive respectively to the beginning and to the end of the first impulse of a series, a clearout circuit for the second counting device closed by the first relay and opened by the second, and an impulse circuit for the second counting device closed by the second relay.

10. In combination, a group of dictation machines, dictation trunks extending respectively to the dictation machines, dictating telephone stations, switching means for connecting any station to any idle dictation machine by way of its dictation trunk for recording voice signals from the connected station and for subsequently severing any such connection, each station including means for sending control signals to any connected dictation trunk, marking means in any dictation trunk for marking the end of a recorded message in response to one such signal, and means responsive to the act of severing a connection between any connected station and dictation trunk for actuating the said marking means.

References Cited in the file of this patent

UNITED STATES PATENTS

| | | |
|---|---|---|
| 1,993,870 | Belliveau | Mar. 12, 1935 |
| 2,066,672 | De Berard et al. | Jan. 5, 1937 |
| 2,200,351 | Whitehead et al. | May 11, 1940 |
| 2,472,435 | Peterson | June 7, 1949 |